United States Patent van Beek et al.

[11] Patent Number: 5,986,029
[45] Date of Patent: Nov. 16, 1999

[54] CATALYST COMPOSITION AND PROCESS FOR THE POLYMERIZATION OF AN OLEFIN

[75] Inventors: Johannes A. M. van Beek, Mountain View, Calif.; Gerardus H. J. van Doremaele, Sittard, Netherlands; Gerardus J. M. Gruter, Maastricht, Netherlands; Henricus J. Arts, Sittard, Netherlands; Guillaume H. M. R. Eggels, Roggel en Neer, Netherlands

[73] Assignee: DSM N.V., Geleen, Netherlands

[21] Appl. No.: 08/841,672

[22] Filed: Apr. 30, 1997

Related U.S. Application Data

[63] Continuation-in-part of application No. PCT/NL95/00372, Oct. 27, 1995.

[30] Foreign Application Priority Data

Oct. 31, 1994 [NL] Netherlands ............................ 9401800

[51] Int. Cl.$^6$ ....................................................... C08F 4/44
[52] U.S. Cl. ......................... 526/160; 526/161; 526/172; 502/103; 502/117; 502/155
[58] Field of Search ..................................... 502/155, 167, 502/103, 117; 526/160, 161, 170, 172, 943; 556/52

[56] References Cited

U.S. PATENT DOCUMENTS

| | | | |
|---|---|---|---|
| 5,512,643 | 4/1996 | Newman et al. | 526/160 |
| 5,512,693 | 4/1996 | Rosen et al. | 556/7 |
| 5,616,748 | 4/1997 | Newman et al. | 556/11 |
| 5,723,398 | 3/1998 | Rosen et al. | 503/103 |
| 5,747,406 | 5/1998 | Reichle et al. | 502/117 |
| 5,780,698 | 7/1998 | Baralt et al. | 585/521 |

FOREIGN PATENT DOCUMENTS

| | | |
|---|---|---|
| 0 365 974 A3 | 5/1990 | European Pat. Off. . |
| 0 608 054 A2 | 7/1994 | European Pat. Off. . |
| WO 92/12112 | 7/1992 | WIPO . |
| WO 92/12117 | 7/1992 | WIPO . |
| WO 93/19104 | 9/1993 | WIPO . |

OTHER PUBLICATIONS

Flores, J.C., et al.; {[2–(Dimethylamino)ethyl] cyclopentadienyl} trichlorotitanium: A New Type of Olefin Polymerization Catalyst; Organometallics, vol. 13, 1994, pp. 4140–4142.

Eshuis, J.J.W., Catalytic Olefin Polymerization with Early Transition Metal Compounds, Ph.D. Thesis, Rijksuniversiteit, The Netherlands, Mar., 1991, Chapter 6.

*Primary Examiner*—Jeffrey T. Smith
*Assistant Examiner*—Roberto Rabago
*Attorney, Agent, or Firm*—Cushman Darby & Cushman, IP Group of Pillsbury Madison & Sutro LLP

[57] ABSTRACT

The invention relates to a new catalyst composition which is suitable for the polymerization of an olefin and which comprises a reduced transition metal complex and a co-catalyst. The invention is characterized in that the transition metal complex consists of a reduced transition metal, chosen from groups 4–6 of the Periodic Table of the Elements, with a multidentate monoanionic ligand and with two monoanionic ligands. In particular the reduced transition metal is titanium (Ti).

21 Claims, No Drawings

CATALYST COMPOSITION AND PROCESS FOR THE POLYMERIZATION OF AN OLEFIN

This application is a Continuation In Part of PCT International Application No. PCT/NL95/00372 filed on Oct. 27, 1995, the complete disclosure of which is incorporated herein by reference.

BACKGROUND OF THE INVENTION

1. Field of the Invention

The invention relates to a catalyst composition which is suitable for the polymerization of an olefin and comprises a reduced transition metal complex and a co-catalyst. The invention also relates to a process for the polymerization of an olefin with such a catalyst composition.

2. Description of the Related Art

Catalyst compositions comprising a reduced transition metal complex and a co-catalyst are known from WO-A-93/19104, which describes complexes of a reduced transition metal of group 4 of the Periodic Table of the Elements, with a bidentate dianionic ligand bonded to it.

The catalyst composition of the present invention is distinguished from that in that the transition metal complex of the present invention consists of a reduced transition metal selected from groups 4–6 of the Periodic Table of the Elements combined with a multidentate monoanionic ligand (X) and two monoanionic ligands (L) as well as, optionally, extra ligands (K).

Such a catalyst composition has not been described before, nor applied in a polymerization of an olefin.

SUMMARY OF THE INVENTION

The catalyst composition of the invention is characterized in that the transition metal complex has the following structure:

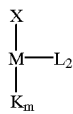
(I)

and the symbols have the following meanings:

M a reduced transition metal from group 4, 5 or 6 of the Periodic Table of the Elements, X a multidentate monoanionic ligand, which is represented by the formula $(Ar-R_t-)_s-Y-(-R_t-DR'_n)_q$ Y a cyclopentadienyl, amido or phosphido group, bonded to M, R a connecting group between the Y group and the $DR'_n$ or Ar group, D an electron-donating hetero atom selected from group 15 or 16 of the Periodic Table of the Elements, R' each, if present, independent of one another can be a hydrocarbon radical or hetero atom containing moiety within the X ligand, Ar an electron-donating aryl group, L monoanionic ligand bonded to M, to the exclusion of a cyclopentadienyl, amido or phosphidino group, K a neutral or anionic ligand bonded to M, m the number of K groups, n the number of R' groups bonded to D, q, s where q and s are the number of $R-DR'_n$ and R—Ar groups bonded to Y, respectively, and where q+s is greater than or equal to one, t the number of R groups connecting the Y group to either or both of the $DR'_n$ and Ar groups, where each t is, independent of the other, either 0 or 1.

DETAILED DESCRIPTION OF THE INVENTION

The present catalyst composition, which is suitable for the polymerization of olefins, comprises a reduced transition metal complex and a co-catalyst.

The various components (groups) of the transition metal complex of the present invention will be discussed in more detail.

a) The transition metal (the M group)

The transition metal in the complex is selected from groups 4–6 of the Periodic Table of the Elements (see the new IUPAC notation to be found on the inside of the cover of the Handbook of Chemistry and Physics, 70th edition, 1989/1990). More preferably, the transition metal is selected from group 4; the highest preference is given to titanium (Ti) as transition metal.

The transition metal is present in reduced form in the complex, which means that the transition metal is in a reduced oxidation state. The term "reduced oxidation state" means an oxidation state which is lower than the highest possible oxidation state (at most $M^{3+}$ for a transition metal of group 4, at most $M^{4+}$ for a transition metal of group 5 and at most $M^{5+}$ for a transition metal of group 6).

b) The X group

The X group is a multidentate monoanionic ligand consisting of three components: the Y group (a cyclopentadienyl, amido or phosphido group), the connecting group (bridge) R and the $DR'_n$ or Ar group (the donor). A multidentate monoanionic ligand is a ligand which is bonded covalently to the transition metal at one site (the anionic site, Y) and may be bonded coordinatively to the transition metal at one (bidentate) other site or at several (tridentate, tetradentate, etc.) sites (via the D or Ar group(s)). Examples of tridentate monoanionic ligands are $Y-R-DR'_{n-1}-R-DR'_n$ and $Y(-R-DR'_n)_2$.

c) The Y group

The Y group may be a substituted cyclopentadienyl group (Cp group), with the possibility of a substitution in the Y group being present in addition to the R—Ar and $R-DR'_n$ substituents on the Y group. One or several of the substituents on the ring is the $R-DR'_n$ group or the R—Ar group. Examples of an X group with such a Y group (or ligand) have the following structure (with substituents on the ring):

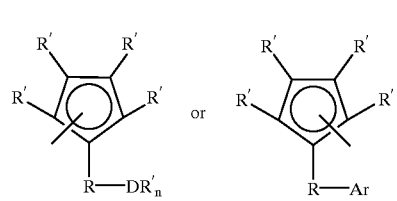
(II)

The Y group may also be a hetero cyclopentadienyl group. Here and in the following a hetero cyclopentadienyl group (in the following also referred to as 'hetero ligand') is understood to be a group that has been derived from a cyclopentadienyl group, but in which at least one of the C atoms in the 5-membered ring of the cyclopentadienyl has been replaced by a hetero atom, which hetero atom can be selected from group 14, 15 or 16 of the Periodic Table of the Elements. If there is more than one hetero atom present in the five-membered ring of the hetero ligand, these hetero atoms may be either the same or different. More preferably, the hetero atom is selected from group 15, while yet more preferably the hetero atom is phosphorus.

The structures herein below illustrate X groups which contain hetero Cp groups. In these representative structures, the Y groups are hetero Cp groups with one phosphorus atom as a hetero-atom in the Cp ring and also one $DR'_n$ group as a ring substituent:

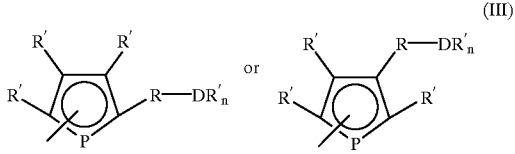

(III)

For clarity's sake it should be pointed out that the M group as a rule is bonded to the Cp group via an $\eta^5$ bond.

The other R' substituents on the ring of the hetero Cp ligand may be of the same type as those which may be present on the Cp group, where R' is defined as set forth in subparagraph g) herein; the hetero ligand may also be a hetero indenyl, hetero fluorenyl or hetero benzoindenyl group.

The numeration of the substitution sites of the indenyl group is in general and in the present description as well based on the IUPAC Nomenclature of Organic Chemistry 1979, rule A 21.1. The numeration of the substituent sites for indene is shown below. This numeration is analogous for an indenyl group:

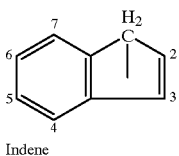

Indene (IV)

The Y group may also be an amido (—NR'—) or a phosphido (—PR'—) group; in other words, the Y group may also be a group which contains nitrogen (N) or phosphorus (P) and is bonded covalently to the M group as well as to the R group.

d) The R group

The R group, which may also be absent (so that the $DR'_n$ or Ar group is bonded directly to the Y group (the Cp, amido or phosphido group)), constitutes the bond between the Y group and the $DR'_n$ or Ar group. The size of the R group is critical to the extent that it determines the accessibility of the M group relative to the $DR'_n$ or Ar group, which gives the desired intramolecular coordination. If the R group (or bridge) is too short, the donor may not coordinate well due to ring tension. The R groups may each separately be a hydrocarbon group with 1–20 carbon atoms (e.g. alkylidene, arylidene, aryl alkylidene, among others). Examples of such groups are methylene, ethylene, propylene, butylene, phenylene, whether or not with a substituted side chain. Preferably, the R group has the following structure:

(V)

where p=1–4. The R' groups may each separately be as defined hereafter in subparagraph g) herein.

Besides carbon, the main chain of the R group may also contain silicon or germanium. Examples of such R groups are: dialkyl silylene, dialkyl germylene, tetra-alkyl disilylene or tetraalkyl silaethylene (—$SiR'_2CR'_2$—). The alkyl groups in such a group preferably have 1–4 carbon atoms and more preferably are a methyl or ethyl group.

e) The $DR'_n$ group

This donor group consists of an electron-donating hetero atom D, selected from group 15 or 16 of the Periodic Table of the Elements, and one or more substituents R' bonded to D. The number of R' groups is linked up with the nature of the hetero atom D, in the sense that n=2 if D is from group 15 and n=1 if D is from group 16. The R' substituent bonded to D is as defined hereafter in subparagraph g) herein with the exception that it cannot be H.

The hetero atom D is preferably selected from the group comprising nitrogen (N), oxygen (O), phosphorus (P) and sulphur (S); more preferably, the hetero atom is nitrogen (N) or phosphorus (P). It is further possible for two R' groups in the $DR'_n$ group to be connected with each other to form a ring-shaped structure (so that the $DR'_n$ group can be a pyrrolidinyl group). The $DR'_n$ group can form coordinative bonds with M.

f) The Ar group

The electron-donating group (or donor) used may also be a substituted or non-substituted aryl group ($C_6R'_5$), such as phenyl, tolyl, xylyl, mesityl, cumenyl, tetramethyl phenyl, pentamethyl phenyl, etc. The coordination of this Ar group in relation to M may vary from $\eta^1$ to $\eta^6$.

g) The R' group

The R' groups may each separately be hydrogen or a hydrocarbon radical with 1–20 carbon atoms (e.g. alkyl, aryl, aryl alkyl and the like as shown in Table 5). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other R' groups are halides, such as chloride, bromide, fluoride and iodide, methoxy, ethoxy and phenoxy. Also, two adjacent hydrocarbon radicals may be connected with each other in a ring system; therefore the Y group may be an indenyl, a fluorenyl or a benzoindenyl group. Such a group as well may contain one or more R' groups as ring substituents. R' may also be a substituent which instead of or in addition to carbon and/or hydrogen may comprise one or more hetero atoms of groups 14–16 of the Periodic Table of the Elements. Thus, a substituent may be a Si-containing group, for example, $SiMe_3$.

Bensley et al., *J. Org. Chem.* 1988, 53, 4417–4419, the complete disclosure of which is incorporated herein by reference, disclosed a tetramethyl-substituted cyclopentadiene containing a diphenylphosphinyl group as the fifth substituent, which is coupled to the Cp via a propylene group.

Kresze et al., *Chemische Berichte* 1963, 666, 45–53, the complete disclosure of which is incorporated herein by reference, disclosed a bis(methoxyethyl)cyclopentadiene.

Hafner et al., *Chemische Berichte* 1963, 661, 52–75, the complete disclosure of which is incorporated herein by reference, disclosed a cyclopentadiene substituted with two adjacent methyl groups in combination with a dimethylamino group which is coupled to the Cp via a methylene group.

A tetramethyl-substituted cyclopentadiene containing an ethoxy group as the fifth substituent which is coupled to the Cp via a dimethylsilylene group was disclosed in EP-A-0, 416,815, the complete disclosure of which is incorporated herein by reference.

A cyclopentadiene which is substituted with one tert-butyl group in addition to either a methoxy or an ethyl methoxy group was disclosed in *Angew. Chem. Int. Ed. EngL.* 1995, 34, 2266–2267, the complete disclosure of which is incorporated herein by reference.

h) the L group

The transition metal complex contains two ligands L, of a monoanionic nature, which are bonded to the transition metal. Examples of such ligands, which may be identical or different, are: a hydrogen atom, halides, an alkyl, aryl or aryl alkyl group, an alkoxy or aryloxy group, a group comprising a hetero atom selected from group 15 or 16 of the Periodic Table of the Elements, for example:

a sulphur compound, such as sulphite, sulphate, thiol, sulphinate, thioalkyl, a phosphorus compound, such as phosphite, phosphate.

Two L groups may also be connected with each other and so form a dianionic bidentate ring system.

These and other ligands can be tested for their suitability by means of simple experiments by one skilled in the art.

Preferably, L is a halide and/or an alkyl or aryl group; more preferably, a Cl group and/or a $C_1$–$C_4$ alkyl or a benzyl group. Excluded L groups are a Cp group, an amido group or a phosphido group (so L cannot be a Y group).

i) the K group

The K group is a neutral or anionic ligand bonded to M. When K is a neutral ligand K may be absent, but when K is monoanionic, the following holds for $K_m$:

m=0 for $M^{3+}$ m=1 for $M^{4+}$ m=2 for $M^{5+}$

The K group may be a ligand as described for the L group or a (substituted) Cp group ($C_5R'_5$), an amido ($NR'_2$) or a phosphido group ($PR'_2$). The K group may also be a neutral ligand such as an ether, an amine, a phosphine, a thioether, among others. Two K groups may also be connected with each other by an R group and so form a bidentate ring system. Thus two K groups may also form together an X group. For each neutral K bonded to M the value of m is higher by one than the value stated above for a monoanionic K group.

As can also be seen from formula (I) the X group of the transition metal complex can consist of a Y group to which are linked, via an R group, one or more donor groups (such as, for example, the Ar and/or the $DR'_n$ groups). The number of donor groups is linked closely to the nature of the Y group; it is at least 1 and at most equal to the number of substitution sites that are present at a Y group.

With reference, by way of example, to the structure according to formula (II), one (1) substitution site in such a Cp group has been taken either by an R—Ar group or by an R—$DR'_n$ group (q+s=1). If all R' groups in formula (II) were an R—Ar group and/or an R—$DR'_n$ group, the value of (q+s) would be 5.

A preferred embodiment of the catalyst composition according to the invention comprises a transition metal complex in which a bidentate/monoanionic ligand is present and in which the reduced transition metal is selected from group 4 of the Periodic Table of the Elements and has an oxidation state of 3+. In this case the catalyst composition according to the invention comprises a transition metal complex of the following structure:

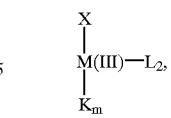
(VI)

where the symbols have the same meaning as described above for formula (I) and where M(III) is a transition metal selected from group 4 of the Periodic Table of the Elements and is in oxidation state 3+.

Such a transition metal complex has no anionic K ligands (for an anionic K, m=0 in case of $M^{3+}$).

It should be pointed out that in WO-A-93/19104 transition metal complexes are also described in which a group 4 transition metal in a reduced oxidation state (3+) is present. The complexes described in WO-A-93/19104 have the general formula:

$$Cp_a(ZY)_b ML_c \qquad (VII)$$

The Y group in this formula (VII) is bonded covalently to the transition metal M (see p. 2 of WO-A-93/19104). This means that the Cp-Z-Y group is of a dianionic nature. The X group in the transition metal complex according to the present invention is of a monoanionic nature. This changes the nature of the transition metal complex and consequently the nature of the catalyst that is active in the polymerization. Without being committed to it, the following theory is proposed. The transition metal complexes described in WO-A-93/19104 are ionic after interaction with the co-catalyst. However, the transition metal complex according to WO-A-93/19104 that is active in the polymerization is of a neutral nature (on the basis of the assumption that the polymerizing transition metal complex comprises, besides M(III), one dianionic ligand and one growing monoanionic polymer chain). By contrast, the polymerization active transition metal complex of the catalyst composition according to the present invention is of a cationic nature (on the basis of the assumption that the polymerizing transition metal complex—based on the formula (VI) structure—comprises, besides M(III), only one monoanionic bidentate ligand and one growing monoanionic polymer chain).

As referred to herein, a coordinate bond is a bond (e.g., $H_3N$—$BH_3$) which when broken, yields either (i) two species without net charge and without unpaired electrons (e.g., $H_3N$: and $BH_3$) or (ii) two species with net charge and with unpaired electrons (e.g., $H_3N.^+$ and $BH_3.^-$). On the other hand, as referred to herein, a covalent bond is a bond (e.g., $CH_3$—$CH_3$) which when broken yields either (i) two species without net charge and with unpaired electrons (e.g., $CH_3$· and $CH_3$·) or (ii) two species with net charges and without unpaired electrons (e.g., $CH_3^+$ and $CH_3^-$). A discussion of coordinate and covalent bonding is set forth in Haaland, *Angew. Chem. Int. Ed. Enal.*, 1989, Vol. 28, 992, the complete disclosure of which is incorporated herein by reference.

Transition metal complexes in which the transition metal is in a reduced oxidation state, but have the following structure:

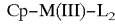
(VII)

as a rule are not active in olefin polymerizations. It is precisely the presence, in the transition metal complex of the present invention, of the $DR'_n$ or Ar group (the donor), bonded to the Y group by means of the R group, that gives a stable transition metal complex suitable for polymerization.

Such an intramolecular donor has been found to form a stable transition metal complex which shows a high catalytic activity. This is surprising since a transition metal complex with an external donor, although being stable, does not show catalytic activity.

The catalyst composition of the present invention also contains a co-catalyst. The co-catalyst can be based on an organometallic compound. The metal in such a compound can be selected from group 1, 2, 12 or 13 of the Periodic Table of the Elements. At least one hydrocarbon radical is bonded directly to the metal via a carbon atom. Suitable organometallic compounds are for instance compounds of sodium, lithium, zinc, magnesium and, preferably, aluminum. The hydrocarbon group used in such compounds preferably contains 1–30, more preferably 1–10 carbon atoms. Examples of suitable compounds are amyl sodium, butyl lithium, diethyl zinc, butyl magnesium chloride and dibutyl magnesium. Preference is given to organoaluminum compounds, such as, for example, the trialkyl aluminum compounds (such as triethyl aluminum, tri-isobutyl aluminum), the alkyl aluminum hydrides (such as di-isobutyl aluminum hydride), alkylalkoxy organoaluminum compound and halogen-containing organoaluminum compounds (such as diethyl aluminum chloride, diisobutyl aluminum chloride, ethyl aluminum sesquichloride). Preferably, linear or cyclic aluminoxanes are used as organoaluminum compound.

As co-catalyst may also be used, besides or in addition to the organometallic compound, a compound which contains or yields in a reaction with the transition metal complex of the present invention a non-coordinating or poorly coordinating anion. Such compounds have been described for instance in EP-A-426,637, the complete disclosure of which is incorporated herein by reference. Such an anion is bonded sufficiently labily to be replaced by an unsaturated monomer during the olefin polymerization. Such compounds are also mentioned in EP-A-277,003 and EP-A-277,004, the complete disclosures of which are incorporated herein by reference. Such a compound preferably contains a triaryl borane or a tetraaryl borate or an aluminum equivalent thereof. Examples of suitable compounds are:

dimethyl anilinium tetrakis (pentafluorophenyl) borate $[C_6H_5N(CH_3)_2H]^+[B(C_6F_5)_4]^-$ dimethyl anilinium bis (7,8-dicarbaundecaborate)-cobaltate (III)

tri(n-butyl)ammonium tetraphenyl borate triphenylcarbenium tetrakis (pentafluorophenyl) borate dimethylanilinium tetraphenyl borate tris(pentafluorophenyl) boron.

If this type of non-coordinating or poorly coordinating anions is used, it is preferable for the transition metal complex to be alkylated (that is to say: the L group is an alkyl group). As described for instance in EP-A-500,944, the complete disclosure of which is incorporated herein by reference, the reaction product of a halogenated transition metal complex and an organometallic compound, such as for instance TEA (=triethyl aluminum), may also be used.

The quantity of co-catalyst on a molar basis relative to the quantity of transition metal complex, in case an organometallic compound is used as co-catalyst, usually is 1:1 to 10,000:1, preferably 1:1 to 2,500:1. If a compound containing or yielding a non-coordinating or poorly coordinating anion is used as co-catalyst, the ratio usually is 1:100 to 1,000:1, preferably 1:1 to 250:1 and more preferably 1:2 to 250:1.

The transition metal complex as well as the co-catalyst may be present in the catalyst composition as a single component or as a mixture of several components. This will notably be the case in those situations where there is a need to influence the molecular properties of the polymer, such as molecular weight and in particular the molecular weight distribution.

The catalyst composition according to the invention can be used in a method as a catalyst component for the polymerization of an olefin. The olefin envisaged in particular is an olefin selected from the group comprising, for example, α-olefin, internal olefin, cyclic olefin and di-olefin. Mixtures of these olefins can also be used.

The invention relates in particular to a process for the polymerization of an α-olefin. The α-olefin is preferably selected from the group comprising, for example, ethene, propene, butene, pentene, heptene, octene and styrene (substituted or non-substituted), mixtures of which may also be used. More preferably, ethene and/or propene is used as α-olefin. The use of such olefins results in the formation of (semi)crystalline polyethene homo- and copolymers, of high as well as of low density (HDPE, LDPE, LLDPE, etc.), and polypropene, homo- and copolymers (PP and EMPP (elastomer-modified polypropylene)). The monomers needed for such products and the processes to be used are known to the person skilled in the art.

The process according to the invention is also suitable for the preparation of amorphous or rubber-like copolymers based on ethene and another α-olefin. Propene is preferably used as the other α-olefin, so that EPM (ethylene-propylene monomer) rubber is formed. It is also quite possible to use a diene in addition to ethene and the other α-olefin, so that a so-called EADM (ethylene α-olefin-diene terpolymer) rubber is formed, in particular EPDM (ethene propene diene rubber).

The catalyst composition according to the invention can be used supported as well as non-supported. The supported catalysts are used mainly in gas phase and slurry processes. The carrier used may be any carrier known as carrier material for catalysts, for instance $SiO_2$, $Al_2O_3$ or $MgCl_2$.

Polymerization of the olefin can be effected in a known manner, in the gas phase as well as in a liquid reaction medium. In the latter case, both solution and suspension polymerization are suitable, while the quantity of transition metal to be used generally is such that its concentration in the dispersion agent amounts to from about $10^{-8}$ to about $10^{-4}$ mol/l, preferably from about $10^{-7}$ to about $10^{-3}$ mol/l.

The process according to the invention will hereafter be elucidated with reference to a polyethene preparation known per se, which is representative of the olefin polymerizations meant here. For the preparation of other polymers on the basis of an olefin the reader is expressly referred to the multitude of publications on this subject.

The preparation of polyethene relates to a process for homopolymerization or copolymerization of ethene with one or more α-olefins having 3–12 carbon atoms and optionally one or more non-conjugated dienes. The α-olefins that are suitable in particular are, for example, propylene, styrene, n-octene, and n-hexene. Suitable copolymers include ethylene homopolymer, ethylene-propylene copolymer, ethylene-propylene-diene terpolymer, ethylene-styrene-octadiene terpolymer, ethylene-styrene copolymer, ethylene-octene copolymer and ethylene-hexene copolymer. Preferred dienes include 1,7-octadiene, 1,9-decadiene, dicyclopentadiene, ethylidene norbornene, vinylnorborene and hexadiene. It has been found that the catalyst composition of the present invention is especially suitable for solution or suspension polymerization of ethene.

Any liquid that is inert relative to the catalyst system can be used as dispersion agent in the polymerization. One or more saturated, straight or branched aliphatic hydrocarbons, such as butanes, pentanes, hexanes, heptanes, pentamethyl heptane or mineral oil fractions such as light or regular petrol, naphtha, kerosene or gas oil are suitable for that purpose. Aromatic hydrocarbons, for instance benzene and toluene, can be used, but because of their cost as well as on account of safety considerations, it will be preferred not to use such solvents for production on a commercial scale. In polymerization processes on a commercial scale, it is preferred therefore to use as solvent the low-priced aliphatic hydrocarbons or mixtures thereof, as marketed by the petrochemical industry. If an aliphatic hydrocarbon is used as solvent, the solvent may yet contain minor quantities of aromatic hydrocarbon, for instance toluene. Thus, if for instance methyl aluminoxane (MAO) is used as co-catalyst, toluene can be used as solvent in order to supply the MAO in dissolved form to the polymerization reactor. Drying or purification is desirable if such solvents are used; this can be done without problems by the average person skilled in the art.

Such a solution polymerization is preferably carried out at temperatures between 150° C. and 250° C.; in general, a suspension polymerization takes place at lower temperatures, preferably below about 100° C.

The polymer solution resulting from the polymerization can be worked up by a method known per se. In general the catalyst is de-activated at some point during the processing of the polymer. The de-activation is also effected in a manner known per se, for example, by means of water or an alcohol. Removal of the catalyst residues can mostly be omitted because the quantity of catalyst in the polymer, in particular the content of halogen and transition metal is very low now owing to the use of the catalyst system according to the invention.

Polymerization can be effected at atmospheric pressure, but also at an elevated pressure of up to about 500 MPa, continuously or discontinuously. If the polymerization is carried out under pressure the yield of polymer can be increased additionally, resulting in an even lower catalyst residue content. Preferably, the polymerization is performed at pressures between about 0.1 and about 25 MPa. Higher pressures, of about 100 MPa and upwards, can be applied if the polymerization is carried out in so-called high-pressure reactors. In such a high-pressure process the catalyst according to the present invention can also be used with good results.

The polymerization can also be performed in several steps, in series as well as in parallel. If required, the catalyst composition, temperature, hydrogen concentration, pressure, residence time, among others, may be varied from step to step. In this way it is also possible to obtain products with a wide molecular weight distribution.

The invention also relates to a polyolefin that can be obtained by means of a polymerization process with utilization of the catalyst composition according to the invention.

The metallocene catalyst and processes for its use are described in the PCT International Application No. PCT/NL95/00372 filed on Oct. 27, 1995 and in Application No. 9401800 filed in the Netherlands on Oct. 31, 1994, the complete disclosures of which are incorporated herein by reference.

The invention will now be elucidated by means of the following non-restrictive examples.

All tests in which organometallic compounds were involved were carried out in an inert nitrogen atmosphere, using standard Schlenk equipment. A method for synthesis of (dimethylaminoethyl)-tetramethyl cyclopentadienyl was published by P. Jutzi et al., Synthesis 1993, 684.

$TiCl_3$, the esters, the lithium reagents, 2-bromo-2-butene and 1-chlorocyclohexene came from Aldrich Chemical Company. $TiCl_3.3THF$ was obtained by heating $TiCl_3$ for 24 hours in THF with reflux. (THF stands for tetrahydrofuran). In the following 'Me' means 'methyl', 'iPr' means 'isopropyl', 'Bu' means 'butyl', 'iBu' means 'isobutyl', 'tertBu' means 'tertiary butyl' 'Ind' means 'indenyl', 'Flu' means 'fluorenyl', 'Ph' means 'phenyl'.

Pressures mentioned are absolute pressures.

Synthesis of bidentate monocyclopentadienyl complexes

EXAMPLE I

Synthesis of (dimethylaminoethyl)tetramethyl-cyclopentadienyltitanium(III)dichloride ($C_5Me_4(CH_2)_2NMe_2TiCl_2$).

a) Preparation of 4-hydroxy-4-(dimethylamino-ethyl)-3,5-dimethyl-2,5-heptadiene 2-bromo-2-butene (108 g; 0.800 mol) was added to 10.0 g of lithium (1.43 mol) in diethyl ether (300 ml) in about 30 minutes with reflux. After stirring overnight (17 hours), ethyl-3-(N,N-dimethylamino)propionate (52.0 g; 0.359 mol) was added to the reaction mixture in about 15 minutes. After stirring for 30 minutes at room temperature 200 ml of water was added dropwise. After separation the water phase was extracted two times with 50 ml of $CH_2Cl_2$. The organic phase was reduced by evaporation and the residue was distilled at reduced pressure. The yield was 51.0 g (67%).

b) Preparation of (dimethylaminoethyl)tetramethyl-cyclopentadiene

The compound (21.1 g; 0.10 mol) prepared as described under a) was added in a single portion to p-toluenesulphonic acid.$H_2O$ (28.5 g; 0.15 mol), dissolved in 200 ml of diethyl ether. After stirring for 30 minutes at room temperature the reaction mixture was poured out in a solution of 50 g of $Na_2CO_3.10H_2O$ in 250 ml of water. After separation the water phase was extracted two times with 100 ml of diethyl ether. The combined ether layer was dried ($Na_2SO_4$), filtered and evaporated. Then the residue was distilled at reduced pressure. The yield was 11.6 g (60%).

c. Preparation of (dimethylaminoethyl)tetramethyl-cyclopentadienyltitanium(III)dichloride 1.0 equivalent of n-BuLi (1.43 ml; 1.6 M) was added (after cooling to −60° C.) to a solution of the $C_5Me_4H(CH_2)_2NMe_2$ of b) (0.442 g; 2.29 mmol) in THF (50 ml), after which the cooling bath was removed. After warming to room temperature the solution was cooled to −100° C. and then $TiCl_3.3THF$ (0.85 g; 2.3 mmol) was added in a single portion. After stirring for 2 hours at room temperature the THF was removed at reduced pressure. After addition of special boiling point gasoline the complex (a green solid) was purified by repeated washing of the solid, followed by filtration and backdistillation of the solvent. It was also possible to obtain the pure complex through sublimation.

EXAMPLE II

Synthesis of 9-(dimethylaminoethyl)octahydro-fluorenyltitanium(III)dichloride ($H_8$-Flu($CH_2$)$_2$NMe$_2$TiCl$_2$).

a. Preparation of (dimethylaminoethyl)bis(1-cyclohexenyl)-methanol 1-chloro-1-cyclohexene (5.8 g; 0.049 mol) was added to lithium (1.1 g; 0.049 mol) in diethyl ether (50 ml) in a single portion. After stirring overnight at room temperature, stirring was continued for 7 more hours with reflux. After cooling, ethyl-3-(N,N-dimethylamino)propionate (3.0 g; 0.021 mol) was added and as a result of the exothermic reaction refluxing occurred. After cooling to room temperature and stirring for another 30 minutes 100 ml of water was added. The water layer was separated off and extracted with diethyl ether. The combined ether layer was dried ($K_2CO_3$), filtered and evaporated. The yield was 4.5 g (83%).

b. Preparation of 9-(dimethylaminoethyl)octahydrofluorene

The compound (3.95 g; 0.015 mol) prepared as described under a) was added to p-toluenesulphonic acid.$H_2O$ (4.0 g; 0.021 mol) in diethyl ether (100 ml), followed by stirring for 1 hour (temperature rising to reflux temperature). After cooling, 25 ml of water and 6.0 g of $Na_2CO_3$. $10H_2O$ (0.021 mol) were added. After separation the water phase was extracted two times with a diethyl ether/pentane mixture (1/1, v/v). The combined organic layers were dried with $K_2CO_3$, filtered and reduced by evaporation. The residue was dissolved in diethyl ether (25 ml), after which a 25 ml n-BuLi solution (1.6 M in hexane; 0.040 mol) was added dropwise. The precipitate was filtered off, washed with diethyl ether (25 ml) and hydrolyzed with methanol. After acidifying with 1 N HCl the methanolic layer was extracted 3 times with 25 ml of pentane. The combined pentane layers were washed twice with water, dried with $K_2CO_3$, filtered and evaporated. The yield was 1.5 g (41%).

c. Preparation of 9-(dimethylaminoethyl)octahydrofluorenyltitanium(III)dichloride 1.0 equivalent of n-BuLi (0.97 ml; 1.6 M) was added (after cooling to −60° C.) to a solution of the $C_{13}H_{17}(CH_2)_2NMe_2$ of b) (0.380 g; 1.55 mmol) in THF (50 ml), after which the cooling bath was removed. After warming to room temperature the solution was cooled to −100° C. and then $TiCl_3$.3THF (0.58 g; 1.55 mmol) was added in a single portion. After stirring for 2 hours at room temperature the THF was removed at sub-atmospheric pressure. The purification was done as in example I.

EXAMPLE III

Synthesis of (dibutylaminoethyl)tetramethyl-cyclopentadienyltitanium(III) dichloride ($C_5Me_4(CH_2)_2NBu_2TiCl_2$).

a. Preparation of ethyl 3-(N,N-di-n-butylamino)propionate

Ethyl 3-bromopropionate (18.0 g; 0.10 mol) was added carefully to di-n-butylamine (25.8 g; 0.20 mol), followed by stirring for 2 hours. Then diethyl ether (200 ml) and pentane (200 ml) were added. The precipitate was filtered off, the filtrate was evaporated and the residue was distilled at sub-atmospheric pressure. The yield was 7.0 g (31%).

b. Preparation of bis(2-butenyl)(di-n-butylaminoethyl)methanol

2-Lithium-2-butene was prepared from 2-bromo-2-butene (16.5 g; 0.122 mol) and lithium (2.8 g; 0.4 mol) as in example I. To this, the ester of a) (7.0 9; 0.031 mol) was added with reflux in approx. 5 minutes, followed by stirring for about 30 minutes. Then water (200 ml) was carefully added dropwise. The water layer was separated off and extracted twice with 50 ml of $CH_2Cl_2$. The combined organic layer was washed once with 50 ml of water, dried with $K_2CO_3$, filtered and evaporated. The yield was 9.0 g (100%).

c. Preparation of (di-n-butylaminoethyl)tetramethyl-cyclopentadiene)

4.5 g (0.015 mol) of the compound of b) was added dropwise to 40 ml of concentrated sulphuric acid at 0° C., followed by stirring for another 30 minutes at 0° C. Then the reaction mixture was poured out in a mixture of 400 ml of water and 200 ml of hexane. The mixture was made alkaline with NaOH (60 g) while being cooled in an ice bath. The water layer was separated off and extracted with hexane. The combined hexane layer was dried with $K_2CO_3$, filtered and evaporated. The residue was distilled at sub-atmospheric pressure. The yield was 2.3 g (55%).

d. Preparation of (di-n-butylaminoethyl)tetramethyl-cyclopentadienyltitanium(III)dichloride 1.0 equivalent of n-BuLi (0.75 ml; 1.6 M) was added (after cooling to −60° C.) to a solution of the $C_5Me_4H(CH_2)_2NBu_2$ of c) (0.332 g; 1.20 mmol) in THF (50 ml), after which the cooling bath was removed. After warming to room temperature the solution was cooled to −100° C. and then $TiCl_3$.3THF (0.45 g; 1.20 mmol) was added in a single portion. After stirring for 2 hours at room temperature the THF was removed at sub-atmospheric pressure. The purification was done as in example I.

EXAMPLE IV

Synthesis of (dimethylaminomethyl)tetra-methyl-cyclopentadienyltitanium(III) dichloride ($C_5Me_4CH_2NMe_2TiCl_2$).

a. Preparation of 4-hydroxy-4-(dimethylaminomethyl)-3,5-dimethyl-2,5-heptadiene

Analogously to example I, this compound was prepared from N,N-dimethyl glycine ethyl ester (6.6 g; 0.050 mol) with a yield of 7.7 g (78%).

b. Preparation of (dimethylaminomethyl)tetramethyl-cyclopentadiene

At 0° C. the compound of a) (7.7 g; 0.039 mol) was added dropwise to concentrated sulphuric acid (30 g), followed by stirring for 30 minutes at 0° C. The reaction mixture was poured out in water (400 ml) and made alkaline with sodium hydroxide. After extraction with $CH_2Cl_2$ the organic layer was evaporated and the residue was distilled at sub-atmospheric pressure. The resulting product was dissolved in a mixture of hexane (50 ml) and diethyl ether (10 ml), after which n-butyl lithium (20 ml 1.6 M in hexane; 0.032 mol) was added dropwise. The precipitate was filtered off, washed with hexane and hydrolyzed with water. After extraction with $CH_2Cl_2$ the organic layer was evaporated and the residue was distilled at sub-atmospheric pressure. The yield was 1.9 g (27%).

c. Preparation of (dimethylaminomethyl)tetramethyl-cyclopentadienyltitanium(III)dichloride 1.0 equivalent of n-BuLi (2.90 ml; 1.6 M) was added (after cooling to −60° C.) to a solution of the $C_5Me_4HCH_2NMe_2$ of b) (0.829 g; 4.63 mmol) in THF (50 ml), after which the cooling bath was removed. After warming to room temperature the solution was cooled to −100° C. and then $TiCl_3$.3THF (1.71 g; 4.6 mmol) was added in a single portion. After stirring for 2 hours at room temperature the THF was removed at sub-atmospheric pressure. The purification was done as in example I.

EXAMPLE V

Synthesis of (dimethylaminopropyl)tetra-methyl-cyclopentadienyltitanium(III) dichloride ($C_5Me_4(CH_2)_3NMe_2TiCl_2$)

a. Preparation of 4-hydroxy-4-(3-bromopropyl)-3,5-dimethyl-2,5-heptadiene

Analogously to example I, 2-lithium-2-butene was prepared from 2-bromo-2-butene (15.0 g; 0.11 mol) and lithium (2.8 g; 0.26 mol). To the product obtained, ethyl 4-bromobutanoate (11.0 g; 0.056 mol) was added dropwise and with reflux at −40–20° C., followed by stirring for 30 minutes at −20° C. Water (200 ml) and subsequently pentane (100 ml) were slowly added dropwise at −20° C. After separation of the layers the water layer was washed two times with 100 ml of pentane/ether (1/1, v/v), after which the combined organic layers were washed with water (50 ml). The organic layer was dried ($K_2CO_3$), filtered and evaporated. The yield was 14.0 g (96%).

b. Preparation of 4-hydroxy-4-(3-dimethylaminopropyl)-3,5-dimethyl-2,5-heptadiene The compound of a) (4.5 g; 17 mmol) was added to 30 g of 40% dimethyl amine in water (0.27 mol), followed by stirring overnight at room temperature and subsequently for 1 hour at 60° C. After addition of $Na_2CO_3$ (5 g) the water layer was extracted with $CH_2Cl_2$. The organic layer was evaporated and the residue was added to a mixture of pentane (100 ml) and 1M HCl (300 ml). After separation the water layer was made alkaline with NaOH (16 g) and extracted three times with $CH_2Cl_2$ (50 ml). The combined organic layers were dried with $K_2CO_3$, filtered and evaporated. The yield was 2.1 g (54%).

c. Preparation of (dimethylaminopropyl)tetramethyl-cyclopentadiene

The compound of b) (2.1 g; 9.3 mmol) was dissolved in diethyl ether (30 ml), after which p-toluene sulphonic acid.$H_2O$ (3.0 g; 15.8 mmol) was added, followed by stirring for 1 hour at room temperature. $Na_2CO_3.10H_2O$ (5 g) and water (25 ml) were added to the reaction mixture. After separation the water layer was extracted twice with $CH_2Cl_2$ and the combined organic layers were evaporated. The residue was dissolved in hexane (50 ml)/diethyl ether (10 ml), after which n-butyl lithium (20 ml 1.6 M; 32 mmol) was added dropwise. The precipitate was filtered off, washed with hexane and hydrolyzed with water. After extraction with $CH_2Cl_2$ the organic layer was dried ($K_2CO_3$), filtered and evaporated. The yield was 0.6 g (31%).

d. Preparation of (dimethylaminopropyl)tetramethyl-cyclopentadienyltitanium(III)dichloride ($C_5Me_4(CH_2)_3NMe_2TiCl_2$)

1.0 equivalent of n-BuLi (1.31 ml; 1.6 M) was added (after cooling to −60° C.) to a solution of the $C_5Me_4(CH_2)_3NMe_2$ of c) (0.435 g; 2.1 mmol) in THF (50 ml), after which the cooling bath was removed. After warming to room temperature the solution was cooled to −100° C. and then $TiCl_3.3THF$ (0.78 g; 2.1 mmol) was added in a single portion. After stirring for 2 hours at room temperature the THF was removed at sub-atmospheric pressure. The purification was done as in example I.

EXAMPLE VI

Synthesis of (N-pyrrolidinylethyl)tetra-methyl-cyclopentadienyltitanium(III)dichloride ($C_5Me_4(CH_2)_2NC_4H_8TiCl_2$)

a. Preparation of ethyl 3-(N-pyrrolidinyl)propionate

Ethyl acrylate (110.0 g; 1.1 mol) was dissolved in THF (250 ml). To this a solution of pyrrolidine (71.5 g; 1.0 mol) in THF (100 ml) was added dropwise in 75 minutes, after which stirring was continued for 3.5 hours at room temperature. The reaction mixture was evaporated by means of a rotary evaporator. The yield was 161.8 g (94%).

b. Preparation of 4-hydroxy-4-(2-N-pyrrolidinylethyl)-3,5-dimethyl-2,5-heptadiene Analogously to example I, 2-lithium-2-butene was prepared from lithium (2.7 g; 0.39 mol) and 2-bromo-2-butene (21.4 g; 0.16 mol). To this a solution of the amino ester of a) (9.5 g; 0.055 mol) in diethyl ether (30 ml) was added dropwise in about 30 minutes. Stirring was continued for 30 minutes, after which 50 ml of water was very carefully added dropwise. After addition of another 100 ml of water and 100 ml of diethyl ether the layers were separated. The water layer was extracted twice with $CH_2Cl_2$. The combined organic layers were washed with 50 ml of water, dried ($MgSO_4$), filtered and evaporated. The yield was 12.2 g (93%).

c. Preparation of (N-pyrrolidinylethyl)tetramethyl-cyclopentadiene

A solution of the crude compound (10.3 g; 43.5 mmol) of b) in 40 ml of diethyl ether was added dropwise in 15 minutes to a solution of p-toluene sulphonic acid.$H_2O$ (10.5 g; 0.055 mol) in diethyl ether (100 ml). After stirring for 3 hours at room temperature the reaction mixture was poured out in a solution of $Na_2CO_3.10H_2O$ (16.5 g) in 500 ml of water. After separation the water layer was extracted twice with diethyl ether. The combined ether layers were dried ($MgSO_4$), filtered and evaporated. The residue (10.1 g) was distilled at sub-atmospheric pressure. The yield was 6.0 g (50%).

d. Preparation of (N-pyrrolidinylethyl)tetra-methylcyclopentadienyltitaniumdichloride ($C_5Me_4(CH_2)_2NC_4H_8)TiCl_2$ A solution of the $C_5Me_4(CH_2)_2NC_4H_8$ (2.3 g; 10.5 mmol) of c) was dissolved in THF (50 ml). After cooling to -60° C. 1.0 equivalent of n-BuLi was added (6.6 ml, 1.6 M), after which the cooling bath was removed. After warming to room temperature the solution was cooled to −80° C. and then 10.3 mmol (3.8 g) of $TiCl_3.3THF$ was added in a single portion. After stirring for 2 hours at room temperature the THF was removed under vacuum. The purification was done as in example I.

Polymerizations under solution conditions at 160° C. Examples VII–XIV and comparative example A 400 ml of pentamethyl heptane (abbreviation: PMH) and ethylene was supplied to a 1.3-liter reactor, with heating to polymerization temperature (160° C.); at a pressure of 2 MPa. Optionally a certain quantity of comonomer (1-octene) was added. Next, the required amount of a methyl aluminoxane (MAO) dissolved in toluene (Witco; 1.6 M) and the catalyst solution or slurry were premixed at room temperature for 1 minute and then supplied to the reactor. The catalyst supply vessel was rinsed out with 100 ml of PMH. The pressure in the reactor was kept constant by supplying ethylene. By cooling the reactor the temperature deviation from the setting (160° C.) was limited to a maximum of 5° C. After 10 minutes the polymerization was stopped and the polymer was worked up by draining the solution and the solvent was evaporated under reduced pressure at 50° C. The results are shown in table 1.

TABLE 1

Polymerization results at 160° C.

[Ti] = concentration of Ti in the reactor (mmol/l)
Al/Ti = molar ratio Al/Ti
ml $C_8$ = number of ml of 1-octene supplied to the reactor
yield = number of grams of ethylene used to keep the pressure in the reactor constant
MI = melt index at the weight stated in brackets in the table
n.d. = not determined

| Example | Transition metal complex | [Ti] | Al/Ti | ml $C_8$ | yield | MI |
|---|---|---|---|---|---|---|
| VII | $(Me_4C_5(CH_2)_2NMe_2)TiCl_2$ | 0.02 | 800 | 0 | 7.5 | 9.0 (10 kg) |
| VIII | " | 0.02 | 1600 | 0 | 7 | n.d. |
| IX | " | 0.02 | 400 | 0 | 6 | n.d. |
| X | " | 0.02 | 800 | 15 | 7 | 18 (1.2 kg) |
| XI | $(Me_4C_5(CH_2)_2NBu_2)TiCl_2$ | 0.02 | 800 | 0 | 10.5 | 10.3 (10 kg) |
| XII | " | 0.02 | 800 | 15 | 11.5 | 11.9 (10 kg) |
| XIII | $(H_8\text{-}Flu(CH_2)_2NMe_2)TiCl_2$ | 0.02 | 800 | 0 | 2 | n.d. |
| XIV | " | 0.04 | 400 | 0 | 3 | n.d. |
| A | For comparison $TiCl_3.3THF$ | 0.04 | 800 | 0 | 0 | n.d. |

EXAMPLES XV–XXXI AND COMPARATIVE EXAMPLES B–F

Polymerizations at lower temperatures 700 ml of PMH and the required quantity of octene were supplied to a 1.5-liter reactor. The ethylene pressure was 0.8 MPa and the temperature was 50, 80, 115 or 120° C. The catalyst slurry or solution were premixed in a catalyst vessel at room temperature for 1 minute with a solution of methyl aluminoxane (MAO) in toluene (Witco; 1.6 M) in such a way that Al/Ti=2000 and then supplied to the reactor. The catalyst vessel was rinsed out with 50 ml of PMH. The pressure in the reactor was kept constant by supplying ethylene.

After 5 to 10 minutes of polymerization the product was collected and dried under vacuum at 60° C. The results are given in table 2a and table 2b. In a few cases a GPC (a gel permeation chromatogram) was made in order to determine the molecular weight Mw (weight average molecular weight).

TABLE 2a

Polymerizations at lower temperatures

| Example | Transition metal catalyst | concentration $*10^{-5}$ M/l | Temp. ° C. | $C_8$ grams | polymer yield kg/g Ti/- 5 min. | Mw kg/mol |
|---|---|---|---|---|---|---|
| XV | $(C_5Me_4(CH_2)_2NBu_2)TiCl_2$ | 0.67 | 115 | 0 | 23 | |
| XVI | " | 0.67 | 115 | 10.8 | 23 | 230 |
| XVII | " | 0.67 | 80 | 0 | 23 | |
| XVIII | " | 0.67 | 80 | 10.8 | 44 | 450 |
| XIX | $(C_5Me_4(CH_2)_2NMe_2)TiCl_2$ | 1.33 | 115 | 0 | 12 | |
| XX | " | 1.33 | 115 | 10.8 | 15 | |
| XXI | " | 1.33 | 80 | 0 | 32 | 66 |
| XXII | " | 0.67 | 80 | 10.8 | 32 | 350 |
| XXIIII | $(C_5Me_4(CH_2)_3NMe_2)TiCl_2$ | 1.33 | 80 | 0 | 5 | |
| XXIV | " | 1.33 | 50 | 0 | 8 | |
| XXV | $(H_8\text{-}Flu(CH_2)_2NMe_2)TiCl_2$ | 1.33 | 115 | 0 | 6 | |
| XXVI | " | 1.33 | 80 | 0 | 14 | |
| XXVII | " | 1.33 | 80 | 10.8 | 14 | 28 |
| XXVIII | " | 1.33 | 50 | 10.8 | 5 | |
| XXIX | $(C_5Me_4(CH_2)_2NC_4H_8)TiCl_2$ | 1.33 | 115 | 0 | 8 | |
| XXX | " | 1.33 | 80 | 0 | 3 | |
| XXXI | " | 1.33 | 80 | 10.8 | 4 | 265 |
| | For comparison: | | | | | |
| B | $TiCl_3.3THF$ | 2.7 | 80 | 0 | 2 | |
| C | " | 2.7 | 80 | 10.8 | <0.1 | |
| D | $(C_5Me_5)TiCl_2.THF$ | 1.33 | 80 | 10.8 | <0.5 | |
| E | $(C_5Me_5)Ti(IV)Cl_3$ | 2.7 | 80 | 10.8 | 1 | |
| F | $(Cp)Ti(IV)Cl_3$ | 2.7 | 80 | 10.8 | 1 | |

TABLE 2b

Polymerizations at lower temperatures (continued)
Examples XXXII–XLVIII and comparative examples G–I
The catalysts given in table 2b have been prepared in an analogous
manner as described in the previous examples out of the Li compounds
of the ligands and $TiCl_3.3THF$.
The polymerizations were performed according to the procedure
described in examples XV–XXXI. However, in the examples XXXII–VLIII
gasoline was used instead of PMH.

| Example | Transition metal catalyst | concentration $*10^{-5}$ M/l | Temp. °C. | $C_8$ grams | polymer yield kg/g Ti/ 5 min. | Mw kg/ mol |
|---|---|---|---|---|---|---|
| XXXII | $(C_5Me_4(CH_2)_2N(C_{10}H_{21})_2)TiCl_2$ | 0.67 | 80 | 18 | 15 | |
| XXXIII | " | 0.67 | 50 | 18 | 2 | |
| XXXIV | $(C_5H_2{}^{tert}Bu_2(CH_2)_2NMe_2)TiCl_2$ | 0.67 | 80 | 18 | 50 | |
| XXXV | " | 1.33 | 120 | 18 | 6 | |
| XXXVI | $(C_5H_2(SiMe_3)_2(CH_2)_2NMe_2)TiCl_2$ | 0.10 | 80 | 18 | 589 | |
| XXXVII | " | 0.10 | 120 | 18 | 20 | |
| XXXVIII | $(C_5H_3({}^{tert}Bu)(CH_2)_2NMe_2)TiCl_2$ | 0.67 | 80 | 18 | 178 | |
| XXXIX | " | 1.33 | 120 | 18 | 10 | |
| XL | $(C_5H({}^iPr)_3(CH_2)_2NMe_2)TiCl_2$ | 0.13 | 80 | 18 | 90 | |
| XLI | " | 0.13 | 120 | 18 | 21 | |
| XLII | $(C_5Me_4(CH_2)_2P^iPr_2)TiCl_2$ | 0.33 | 120 | 18 | 130 | 32 |
| XLIII | $(C_5Me_4Me_2SiP^iPr_2)TiCl_2$ | 0.26 | 80 | 18 | 395 | |
| XLIV | " | 0.26 | 120 | 18 | 240 | |
| XLV | $(C_5Me_4Me_2SiCH_2PPh_2)TiCl_2$ | 0.13 | 80 | 18 | 219 | |
| XLVI | " | 0.13 | 120 | 18 | 25 | |
| XLVII | $(C_5Me_4(CH_2)_2P^iBu_2)TiCl_2$ | 0.33 | 80 | 18 | 98 | |
| XLVIII | " | 0.33 | 120 | 18 | 112 | 16 |
| For comparison: | | | | | | |
| G | $(Ind)Ti(IV)Cl_3$ | 2.67 | 80 | 18 | 0 | |
| H | " | 1.33 | 120 | 18 | 0 | |
| I | $(C_5H_2(SiMe_3)_2(CH_2)_2NMe_2)Ti(IV(Cl_3)$ | 0.26 | 80 | 18 | 9 | |
| | " | 0.26 | 120 | 18 | 2 | |

EXAMPLE XLIX

Ethylene/propene copolymerizations (method 1)

The batch copolymerization experiments were carried out in a stirred 1.5-liter glass reactor. 3.125 mmol of Witco MAO (1.6 M in toluene) was supplied to the reactor as well as 500 ml of heptane which was saturated with ethylene and propene at a pressure of 0.8 MPa and a temperature of 70° C. (the C2/C3 ratio in the gas phase was 2). 0.005 mmol of the $(C_5Me_4(CH_2)_2NBu_2)TiCl_2$ of example III was pre-mixed with 3.125 mmol of Witco MAO for 1 minute, after which the mixture was injected into the reactor. The polymerization time was 20 minutes. 16 g of a clear polymer was obtained. The proportion of C3 incorporated was 60% (determined by means of IR measurement) and the Hoekstra value was 38.

EXAMPLES L–LIV

Ethylene/propene copolymerizations (method 2)

The batch copolymerization experiments were carried out in a stirred 1.5-liter glass reactor. 500 ml of PMH which was saturated with ethylene and propene at a pressure of 1.0 MPa was supplied to the reactor at temperature of 80° C. (the C2/C3 ratio in the gas phase was 0.5). 0.01 mmol of the Ti compound was pre-mixed with 10 mmol of Witco MAO (1.6 M in toluene) for 1 minute, after which the mixture was injected into the reactor. The polymerization time was 10 minutes.
The proportion of C3 incorporated was determined by means of IR measurement.

TABLE 3

| Example | transition metal complex | |
|---|---|---|
| L | $(C_5Me_4(CH_2)_2N(C_{10}H_{21})_2)TiCl_2$ | 7.7 grams clear rubber with 63% $C_3$ |
| LI | $(C_5Me_4(CH_2)_2N^iBu_2)TiCl_2$ | 3.1 grams clear rubber |
| LII | $(C_5H(^iPr)_3(CH_2)_2NMe_2)TiCl_2$ | 10.0 grams rubber |
| LIII | $(C_5Me_4Me_2SiCH_2PPh_2)TiCl_2$ | 20.4 grams rubber with 14 % $C_3$ |
| LIV | $(C_5H_3({}^{tert}Bu)(CH_2)_2NMe_2)TiCl_2$ | 9.0 grams rubber with 15 % $C_3$ |

EXAMPLES LV and LVI

Continuous polymerizations at 160° C.

Continuous ethylene/octene copolymerizations were performed using the methylated catalyst of example I with $[PhMe_2NH][B(C_6F_5)_4]$ as activator and TEA as scavenger. The autoclave (2 L, 9.0 MPa) was completely filled with gasoline. In example LV the $H_2$ feed was 0.4 nL/hr and in example LVI no $H_2$ was used.

The catalyst given in example I was methylated with MeLi in diethylether using standard procedures.
The results are presented in table 4.

TABLE 4

| Example | activity Kg/mol Ti | D23 density | MI | Mw/Mn | MFR I21/I2 | C8/C2 (m/ml) |
|---|---|---|---|---|---|---|
| LV | 6672 | 912 | 0.5 | 2.3 | 46.5 | 0.2 |
| LVI | 6960 | 887 | 17 | 2.5 | 26.5 | 0.59 |

EXAMPLE LVII

Synthesis of pentamethylbenzyl cyclopentadienyl titanium dichloride ($C_6Me_5CH_2C_5H_4TiCl_2$)

a. Synthesis of pentamethylbenzyl cyclopentadiene

A 250 ml roundbottom flask equipped with a condenser, stirrer, thermometer and dropping funnel with nitrogen inlet was charged with 100 ml THF in which pentamethylbenzyl chloride (19.8 g, 0.10 mol) was dissolved. The solution was cooled to −20° C. and sodium cyclopentadienyl (60 ml, 2.0 M in THF) was added; the solution was stirred for 48 hours at 22° C. GC analysis showed 90% conversion to pentamethylcyclopentadienyl. A precipitate was filtered off and the solvent was evaporated. The remaining residue was recrystallized from hot dichloromethane/petroleum ether. After recrystallization, pentamethylcyclopentadiene (16 g) was obtained. The product was characterized by GC, GC-MS, $^{13}C$ and $^1H$ NMR.

b. Preparation of pentamethylbenzyl cyclopentadienyl titanium dichloride

One equivalent of n-BuLi (2.13 ml; 1.6 M in hexane) was added to a solution of pentamethylbenzyl cyclopentadiene (0.77 g, 3.4 mmol), dissolved in 40 ml of diethyl ether and cooled to −80° C. The solution was allowed to warm to room temperature. After stirring for 90 minutes, $TiCl_3.3THF$ (1.21 g, 3.26 mmol) was added and the stirring continued for another 16 hours. The reaction mixture was filtered, the solvent evaporated, and the product crystallized from ligroin.

EXAMPLE LVIII

Synthesis of ((di-n-butylamino)dimethylsilyl)tetramethyl cyclopentadienyl titanium dichloride (($n-Bu)_2NSiMe_2C_5Me_4TiCl_2$)

a. Preparation of ((di-n-butylamino)dimethylsilyl) tetramethyl cyclopentadiene

A 250 ml roundboftom flask equipped with a condenser, stirrer, thermometer and dropping funnel with nitrogen inlet was charged with 50 ml diethyl ether in which di-n-butylamine (3.8 g, 27 mmol) was dissolved. The solution was cooled to 0° C. and n-butyllithium (26 mmol, 1.6 M in hexane) was added; the solution was stirred for 2 hours at 2° C. and 30 minutes ar room temperature. The solution was then cooled to −90° C. and tetramethylcyclopentadienyl-dimethylsilylchloride (5.7 g, 27 mmol) was added in one portion. The mixture was then stirred for 16 hours allowing the temperature of the reaction mixture to rise to room temperature. A precipitate was filtered off and the solvent was evaporated. The remaining residue was distilled at sub-atmospheric pressure (2.7 mbar) at 130° C. to obtain di-n-butylamino-dimethylsilyl-tetramethylcyclopentadiene (3.4 g). The product was characterized by GC, GC-MS, $^{13}C$ and $^1H$ NMR.

b. Preparation of ((di-n-butylamino)dimethylsilyl) tetramethyl cyclopentadienyl titanium dichloride In a flask N,N-di-n-butylamine (0.42 g, 3.26 mmol) was added to 10 ml THF. The solution was cooled to −60° C. and one equivalent of butyllithium (2.0 ml, 1.6 M in hexane) was added. The cooling bath was removed and the temperature of the reaction mixture was allowed to rise to room temperature in 20 minutes. The solution was then cooled back down to −60° C. Subsequently the ligand from step a above was added (1.0 g, 3.26 mmol) and the solution stirred for 2 hours at room temperature. A cooled (−60° C.) solution of $TiCl_3.3THF$ (1.21 g, 3.26 mmol) in 10 ml THF was added and the mixture stirred for 2.5 hours. The solvent was evaporated and the residue washed with ligroin and dried to obtain ((di-n-butylamino)dimethylsilyl)tetramethyl cyclopentadienyl titanium dichloride (1.2 g).

EXAMPLE LIX

Synthesis of ((dimethylphosphino)dimethylsilyl) tetramethyl cyclopentadiene titanium dichloride ($Me_2PSiMe_2C_5Me_4)TiCl_2$ a. Preparation of ((dimethylphosphino)dimethylsilyl) tetramethyl cyclopentadiene A 250 ml roundboftom flask equipped with a condenser, stirrer, thermometer and dropping funnel with nitrogen inlet was charged with 100 ml of diethyl ether in which tetramethylcyclopentadienyl-dimethylsilylchloride (8.0 g, 37 mmol) was dissolved. The solution was cooled to −100° C. and lithium-dimethylphosphide (11.22 g in 50 ml THF, 18 mmol) was added; the solution was stirred for 16 hours allowing the 20 temperature of the reaction mixture to rise to room temperature. A precipitate was filtered off and washed with diethyl ether. The organic layers were combined and the solvent evaporated. The remaining residue was distilled at sub-atmospheric pressure (2.4 mbar) at 123° C. to obtain dimethylphosphino-dimethylsilyl-tetramethylcyclopentadiene (0.9 g). The product was characterized by GC, GC-MS, $^{13}C$ and $^1H$ NMR.

b. Preparation of ((dimethylphosphino)dimethylsilyl) tetramethyl cyclopentadienyl titanium dichloride In a flask dimethylphosphine (0.2 g, 3.26 mmol) was added to 10 ml THF. The solution was cooled to −60° C. and one equivalent of butyllithium (2.0 ml, 1.6 M in hexane) was added. The cooling bath was removed and the temperature of the reaction mixture was allowed to rise to room temperature in 20 minutes. The solution was then cooled back down to −60° C. Subsequently the ligand from step a above was added (0.77 g, 3.26 mmol) and the solution stirred for 2 hours at room temperature. A cooled (−60° C.) solution of $TiCl_3.3THF$ (1.21 g, 3.26 mmol) in 10 ml THF was added and the mixture stirred for 2.5 hours. The solvent was evaporated and the residue dried to obtain ((dimethylphosphino)dimethylsilyl)tetramethyl cyclopentadienyl titanium dichloride in quantitative yield.

EXAMPLE LX

Synthesis of ((N,N-dimethylamino)dimethylsilyl) tetramethyl cyclopentadiene titanium dichloride ($Me_2NSiMe_2C_5Me_4)TiCl_2$ a. Preparation of ((N,N-dimethylamino)dimethylsilyl) tetramethyl cyclopentadiene A 250 ml roundboftom flask equipped with a condenser, stirrer, thermometer and dropping funnel with nitrogen inlet was charged with 100 ml of dimethylamine solution (2.0 M in THF, 0.20 mol) and cooled to 15° C. A solution of tetramethylcyclopentadienyl-dimethylsilylchloride in THF (10.1 g in 30 ml THF, 47 mmol) was added and the solution stirred for 16 hours allowing the temperature of the reaction mixture to rise to room temperature. A precipitate was filtered off and the solvent evaporated. The remaining residue was distilled at sub-atmospheric pressure (2.6 mbar) at 80–81° C. to obtain N,N-dimethylamino-dimethylsilyl-tetramethylcyclopentadiene (4.2 g). The product was characterized by GC, GC-MS, $^{13}C$ and $^1H$ NMR.

b. Preparation of ((N,N-dimethylamino)dimethylsilyl) tetramethyl cyclopentadienyl titanium dichloride In a flask N,N-dimethylamine (0.15 g, 3.26 mmol) was added to 10 ml THF. The solution was cooled to −60° C. and one equivalent of butyllithium (2.0 ml, 1.6 M in hexane) was added. The cooling bath was removed and the temperature of the reaction mixture was allowed to rise to room temperature in 20 minutes. The solution was then cooled back down to −60° C. Subsequently the ligand from step a above was added (0.72 g, 3.26 mmol) and the solution stirred for 2 hours at room temperature. A cooled (−60° C.) solution of TiCl$_3$.3THF (1.21 g, 3.26 mmol) in 10 ml THF was added and the mixture stirred for 2.5 hours. The solvent was evaporated and the residue dried to obtain ((N,N-dimethylamino)dimethylsilyl)tetramethyl cyclopentadienyl titanium dichloride in quantitative yield.

EXAMPLE LXI

Synthesis of ((di-isopropylphosphino)dimethylsilyl) tetramethyl cyclopentadienyl titanium dichloride ((i-Pr)$_2$PSiMe$_2$C$_5$Me$_4$)TiCl$_2$ a. Preparation of ((di-isopropylphosphino)dimethylsilyl) tetramethyl cyclopentadiene A 500 ml roundbottom flask equipped with a condenser, stirrer, thermometer and dropping funnel with nitrogen inlet was charged with 125 ml of THF in which tetramethylcyclopentadienyl-dimethylchlorosilane (11.0g) was dissolved. A solution of lithium di-isopropylphosphide ((55 ml, 1.6 M in hexane), which was prepared from 10.38g di-isopropylphosphine and butyllithium) was added, with the temperature of the reaction controlled so as to not exceed 30° C. The solution was then stirred for 16 allowing the temperature to rise to room temperature. The solvent was evaporated and 500 ml diethyl ether was added. The LiCl precipitate was removed by filtration after which the diethyl ether was evaporated. The solid residue was twice washed with 50 ml portions of ligroin and then dried to obtain lithium((di-isopropylphosphino)dimethylsilyl)tetramethyl cyclopentadienyl (6.2g). The product was characterized by $^1$H and $^{31}$P NMR.

b. Preparation of ((di-isopropylphosphino)dimethylsilyl) tetramethyl cyclopentadienyl titanium dichloride A 1000 roundbottomed flask was charged with TiCl$_3$.3THF (12.4 g, 33.5 mmol) and 150 ml THF. The solution was cooled to −60° C. A solution of lithium((di-isopropylphosphino)dimethylsilyl)tetramethyl cyclopentadienyl (33mmol) was added and the reaction mixture stirred for 2.5 hours while allowing the temperature of the reaction mixture to rise to room temperature. The solvent was evaporated and the residue was washed with ligroin giving the product, ((di-isopropylphosphino)dimethylsilyl) tetramethyl cyclopentadienyl titanium dichloride, in quantitative yield.

EXAMPLE LXII

Synthesis of pentamethylbenzyl(N-t-butyl)amino titanium dichloride Me$_5$C$_6$C$_2$H$_2$N(t-Bu)TiCl$_2$ a. Preparation of pentamethylbenzyl(N-t-butyl)amine A 500 ml roundbottom flask equipped with a condenser, stirrer, thermometer and dropping funnel with nitrogen inlet was charged with 100 ml diethyl ether in which t-butylamine (8.32g, 0.114 mmol) was dissolved. The solution was cooled to −33° C. and 1 equivalent of butyllithium (72 ml, 1.6 M in hexane) was added in 15 minutes. After the temperature of the reaction mixture was allowed to rise to room temperature, 75 ml THF was added. The temperature rose slightly from 20° C. to 22° C. and held for 15 minutes. NMR analysis showed 90% conversion to the desired product. The reaction mixture was cooled in an ice/water bath and quenched with NH$_4$Cl. The layers were separated and the organic layer was washed with water. The combined water layers were twice washed with 150 ml portions of ethyl and then dried. The product was recrystallized from hot trichloromethane/hexane to yield 11.3 g pure product. The product was characterized by GC, GC-MS, $^1$H and $^{13}$C NMR.

b. Preparation of pentamethylbenzyl(N-t-butyl)amino titanium dichloride

To a solution of pentamethylbenzyl(N-t-butyl)amine (2 g, 8.6 mmol) in diethyl ether at −60° C. was added, over 15 minutes, I equivalent of n-butyllithium (5.4 ml, 1.6 M in hexane). Subsequently the temperature of the solution was allowed to warm to room temperature after which it was again cooled to −60° C. Subsequently TiCl$_3$.3THF (3.21 g, 8.7 mmol) was added in one portion. After the temperature of the reaction mixture was raised to room temperature, all solvent was removed under reduced pressure to yield an oil which was used as such.

TABLE 5

Examples of transition metal complexes according to the invention (see formula I and IV)

| M | L | Y | R | D | R' | K |
|---|---|---|---|---|---|---|
| Ti | Cl | C$_5$H$_4$ | dimethylsilyl | N | methyl | L |
| Zr | F | C$_5$Me$_4$ | diethylsilyl | P | ethyl | Y-R' |
| Hf | Br | Indenyl | dipropylsilyl | As | propyl | X |
| V | I | Fluorenyl | dibutylsilyl | Sb | n-butyl | diethyl ether |
| Nb | methyl | benzofluorenyl | methylamido | O | n-pentyl | tetrahydrofuran |
| Ta | methoxy | octahydrofluorenyl | dimethylgermanyl | S | methoxy | trimethylamine |
| Cr | ethoxy | C$_5$H$_3$(N—Bu) | diethylgermanyl | Se | ethoxy | triethylamine |
| Mo | hydride | tetrahydroindenyl | diethylpropylene | | Cl | trimethylphosphine |
| W | isopropyl | C$_5$H$_3$(SiMe$_3$) | tetramethyldisiloxane | | F | triethylphosphine |
| | octyl | methylamido | diphenylsilyl | | Br | triphenylphosphine |
| | propoxy | phenylphosphido | tetramethylsilaethylene | | I | dimethylsulphide |
| | phenoxy | | methylene | | phenoxy | dimethylaniline |
| | benzyl | | diethylmethylene | | benzyl | |
| | methylthio | | ethylene | | H | |
| | | | dimethylethylene | | | |
| | | | ethylphosphido | | | |
| | | | phenylphosphido | | | |

What we claim is:

1. A catalyst composition for polymerizing at least one olefin, the catalyst composition comprising a reduced transition metal complex and a co-catalyst, wherein the reduced transition metal complex is represented by the following structure:

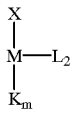

wherein the symbols represent the following:

M is a reduced transition metal selected from group 4, 5 or 6 of the Periodic Table of the Elements, wherein group 4 metals are in the 3+ oxidation state, group 5 metals are in the 3+ or 4+ oxidation states, and group 6 metals are in the 3+, 4+, or 5+ oxidation states;

X is a multidentate monoanionic ligand represented by the formula, $(Ar-R_t-)_s-Y-(-R_t-DR'_n)_q$;

Y is a member selected from the group consisting of a cyclopentadienyl, amido, or phosphido group, bonded to M;

R is at least one member selected from the group consisting of (i) a connecting group between the Y group and the $DR'_n$ group and (ii) a connecting group between the Y group and the Ar group, wherein when the ligand contains more than one R group, the R groups can be identical or different from each other;

D is an electron-donating hetero-atom selected from group 15 or 16 of the Periodic Table of the Elements, R' is a substituent selected from the group consisting of a hydrogen, hydrocarbon radical and hetero-atom containing moiety, except that R' can not be hydrogen when R' is directly bonded to the electron-donating hetero atom D, and wherein when the multidentate monoanionic ligand X contains more than one of the substituent R', the substituents R' can be identical or different from each other;

Ar is an electron-donating aryl group,

L is a monoanionic ligand bonded to the reduced transition metal M, wherein the monoanionic ligand L is not a ligand comprising a cyclopentadienyl, amido or phosphido group, and wherein the monoanionic ligands L can be identical or different from each other;

K is a neutral or anionic ligand bonded to the reduced transition metal M, wherein when the transition metal complex contains more than one ligand K, the ligands K can be identical or different from each other;

m is the number of K ligands bonded to M, wherein when the K ligand is a monoanionic ligand the number of monoanionic K ligands bonded to M is 0 when M is $M^{3+}$, the number of monoanionic K ligands bonded to M is 1 when M is $M^{4+}$ and the number of monoanionic K ligands bonded to M is 2 when M is $M^{5+}$, and wherein m increases by 1 for each neutral K ligand bonded to M;

n is the number of the R' groups bonded to the electron-donating hetero-atom D, wherein when D is selected from group 15 of the Periodic Table of Elements n is 2, and when D is selected from group 16 of the Periodic Table of Elements n is 1;

q, s are the number of $R-DR'_n$ and R—Ar groups bonded to Y, respectively, wherein q+s is an integer not less than one; and t is the number of R groups connecting each of (i) the Y group and Ar groups and (ii) the Y group and the $DR'_n$ groups, wherein t is 1 in each of (i) and (ii).

2. A catalyst composition according to claim 1, wherein the Y group is a cyclopentadienyl group.

3. A catalyst composition according to claim 2, wherein the cyclopentadienyl group is an indenyl, benzoindenyl, or fluorenyl group.

4. A catalyst composition according to claim 2, wherein the reduced transition metal complex is represented by the following structure:

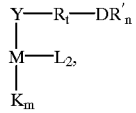

wherein M is a transition metal from group 4 of the Periodic Table of the Elements in oxidation state 3+.

5. A catalyst composition according to claim 2, wherein the transition metal (M) is titanium.

6. A catalyst composition according to claim 2, wherein the electron-donating hetero-atom D is nitrogen (N) or phosphorus (P).

7. A catalyst composition according to claim 2, wherein each R' group in the $DR'_n$ group is an n-alkyl group.

8. A catalyst composition according to claim 2, wherein each R group is selected from the group consisting of and represented by the following structures:

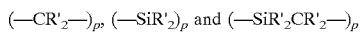

wherein R' is as defined above, p is in a range of from 1 to 4, and wherein each R' group can be identical or different from the other R' groups.

9. A catalyst composition according to claim 2, wherein the L ligands are independently selected from the group consisting of hydrogen, halides, alkyl groups, aryl groups, aryl alkyl groups, alkoxy groups, aryloxy groups, and a group comprising a hetero atom from group 15 or 16 of the Periodic Table of Elements, excluding amido or phosphido groups.

10. A catalyst composition according to claim 9, wherein the L ligands are independently selected from the group consisting of halides, alkyl groups and benzyl groups.

11. A catalyst composition according to claim 2, wherein the Y group is a cyclopentadienyl group substituted with R' groups in addition to the substituents required by the definition of the X group.

12. A catalyst composition according to claim 2, wherein the co-catalyst is at least one member selected from the group consisting of linear aluminoxanes, cyclic aluminoxanes, triaryl boranes and tetraaryl borates.

13. A catalyst composition according to claim 2, wherein the Ar group is further substituted with R' groups in addition to the substituents required by the definition of the X group.

14. A catalyst composition according to claim 13, wherein the Ar group is a member selected from the group consisting of phenyl, tolyl, xylyl, mesityl, cumenyl, tetramethyl phenyl, and pentamethyl phenyl.

15. A catalyst composition according to claim 2, wherein each K ligand is independently selected from the group consisting of hydrogen, halides, alkyl groups, aryl groups, aryl alkyl groups, alkoxy groups, aryloxy groups, a group comprising a hetero atom from group 15 or 16 of the Periodic Table of Elements, cyclopentadienyl groups, amido groups, phosphido groups, ethers, amines, phosphines, and thioethers.

16. A process for the polymerization of at least one olefin to form a polyolefin, said process comprising the steps of:
  polymerizing at least one olefin under effective polymerization conditions in the presence of a catalyst composition according to claim 1; and
  obtaining the polyolefin.

17. A process according to claim 16, wherein the olefin is at least one selected from the group consisting of α-olefin, internal olefin, cyclic olefin and di-olefin and any combination thereof.

18. A process according to claim 17, wherein the α-olefin is at least one selected from the group consisting of ethylene, propylene, butene, pentene, heptene, octene, styrene, and any combination thereof.

19. A process according to claim 18, wherein the α-olefin is either ethylene or propylene.

20. A process for the preparation of an amorphous copolymer comprising the steps of:
  polymerizing a mixture formulated from ethylene, at least one α-olefin, and at least one diene under effective polymerization conditions in the presence of a catalyst composition according to claim 1; and
  obtaining the amorphous copolymer.

21. A process according to claim 20, wherein the α-olefin is propylene.

* * * * *